(12) United States Patent
Wanner et al.

(10) Patent No.: US 8,172,952 B2
(45) Date of Patent: *May 8, 2012

(54) REDUCTION OF HYDROGEN SULFIDE IN WATER TREATMENT SYSTEMS OR OTHER SYSTEMS THAT COLLECT AND TRANSMIT BI-PHASIC FLUIDS

(75) Inventors: Mark J. Wanner, Aliquippa, PA (US); Ron Anderson, Belpre, OH (US); Thomas P. Wilson, Jr., Floresville, TX (US)

(73) Assignee: Clearwater International, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,434

(22) Filed: Feb. 21, 2007

(65) Prior Publication Data

US 2008/0197085 A1    Aug. 21, 2008

(51) Int. Cl.
*B08B 9/027* (2006.01)

(52) U.S. Cl. .............. 134/22.11; 134/22.14; 134/22.19; 210/749; 210/752

(58) Field of Classification Search .................. None
See application file for complete search history.

(56) References Cited

U.S. PATENT DOCUMENTS

| | | | |
|---|---|---|---|
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley, et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/22 |
| 4,112,052 A | 9/1978 | Sartori et al. | 423/223 |
| 4,113,631 A | 9/1978 | Thompson | 507/209 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |

(Continued)

FOREIGN PATENT DOCUMENTS

CA    2125513    1/1995

(Continued)

OTHER PUBLICATIONS

U.S. Appl. No. 12/075,461, filed Mar. 11, 2008, Gatlin et al.

(Continued)

*Primary Examiner* — Michael Kornakov
*Assistant Examiner* — Eric Golightly
(74) *Attorney, Agent, or Firm* — Robert W Strozier

(57) ABSTRACT

A method for reducing noxious sulfur species including hydrogen sulfide in sewage collection systems including force mains is disclosed, where the method involves administering a an effective amount of a composition including a water soluble sulfur scavenger and an oil soluble sulfur scavenger in the presence of sufficient surfactant to produce a homogeneous product.

36 Claims, No Drawings

U.S. PATENT DOCUMENTS

| | | | |
|---|---|---|---|
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,336,431 A * | 8/1994 | Richards et al. | 252/184 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 501/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |

FOREIGN PATENT DOCUMENTS

| | | |
|---|---|---|
| CA | 2007965 | 2/1996 |
| DE | 4027300 | 5/1992 |
| EP | 0730018 A1 | 9/1996 |
| GB | 775376 | 10/1954 |
| GB | 816337 A | 7/1959 |
| GB | 1073338 A | 6/1967 |
| JP | 10001461 | 6/1988 |
| JP | 08151422 | 11/1996 |
| JP | 10110115 A | 4/1998 |
| JP | 2005194148 A | 7/2005 |
| WO | WO 98/19774 | 5/1998 |
| WO | WO 98/56497 | 12/1998 |

OTHER PUBLICATIONS

U.S. Appl. No. 11/554,834, filed Oct. 31, 2006, Venditto et al.
U.S. Appl. No. 11/765,306, filed Jun. 19, 2007, Kakadjian et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.
U.S. Appl. No. 12/029,335, filed Feb. 11, 2008, Kakadjian et al.
Sartori, F. and Savage, D.W., Sterically Hindered Amines for CO2 Removal from Gases, Ind. Eng. Chem. Fundam. 1983, 22, 239-249.
Fushslueger, U., Socher, G., Grether, H-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.
Kauffman, W.J., Observations on the Synthesis and Characterization of N,N',N"-Tris-(dimethylaminopropyly)hexahydro-s-triazine and isolable intermediates, XP009005168.
Delepine, M., Effect of Hydrogen Sulfide on Trimethyltrimethyl Triamine, Bull. Soc. Chim., 1896, 14, 889-891 (English Translation).

* cited by examiner

REDUCTION OF HYDROGEN SULFIDE IN WATER TREATMENT SYSTEMS OR OTHER SYSTEMS THAT COLLECT AND TRANSMIT BI-PHASIC FLUIDS

BACKGROUND OF THE INVENTION

1. Field of the Invention

The present invention relates to a method for reducing noxious sulfur species in pipelines using an effective amount of a sulfur scavenger composition, where a fluid flowing through the pipeline includes an aqueous phase and an organic phase and the composition is adapted to reduce noxious sulfur species in both the aqueous phase and the organic or oil phase.

More particularly, the present invention relates to a method for reducing noxious sulfur species in pipeline, especially pipelines with low flow rate, including administering to the pipeline at its start or at one or more locations along is length an effective amount of a sulfur scavenger composition including a water soluble sulfur scavenger and an oil soluble sulfur scavenger, where a fluid flowing through the pipeline includes an aqueous phase and an organic phase and where the composition is adapted to simultaneously reduce noxious sulfur species in both phases in the pipeline. The present invention also relates to compositions including water, a water soluble sulfur scavenger, an oil soluble sulfur scavenger and a surfactant or emulsifier present in an amount sufficient to produce a stable, homogeneous composition.

2. Description of the Related Art

Sewage collection systems for sewage lines include force mains that force the sewage to travel up a grade or hill. In these force mains, the fluid flow becomes laminar causing a slime layer to build up on the pipe walls. In this biomass or slime layer, sulfate reducing bacteria (SRBs) begin to grow and produce $H_2S$. Once produced in the biomass or slime layer, the $H_2S$ migrates into the aqueous phase, but while in the slime layer, the $H_2S$ can and does cause pipe corrosion. Thus, the $H_2S$ produced in the slime layer is responsible for a foul smelling aqueous phase and the build up of $H_2S$ in overhead spaces and is responsible for pipe corrosion.

Current treatment methods and composition have focused on removing $H_2S$ from the aqueous phase, with either no success or limited success, because the root cause of $H_2S$ production was not addressed.

The same problems found in sewages lines is also found in any pipeline through which a bi-phasic mixture is being transmitted and where the flow characteristics in the pipeline or a portion thereof assumes a laminar flow or a reduced flow rate sufficient to permit phase separation with the organic phase adhering to the pipeline walls forming a oil layer.

Thus, there is a need in the art for a sulfur scavenging composition and for methods for its administration into pipelines such as pipelines associated with sewage collection systems or the transportation of any fluid including an aqueous phase and an organic or oil phase that is capable of reducing noxious sulfur species including $H_2S$ in both phases, assisting to retain organic materials in the aqueous phase, reducing odors and/or reducing pipeline corrosion problems.

The solution to the above problems was to combine a water soluble hydrogen sulfide or sulfur scavenger and oil soluble hydrogen sulfide or sulfur scavenger in the presence of an amount of a surfactant or emulsifier or mixtures thereof to produce a homogeneous treating composition. The oil soluble components are adapted to partition into the organic phase and into any organic layers coating walls of the pipeline such as a slime layer in sewage pipelines reducing transference of noxious sulfur species such as $H_2S$ into the aqueous phase; while the water soluble components are adapted to partition into the aqueous phase removing any transferred noxious sulfur species such as $H_2S$ therein.

DEFINITIONS USED IN THE INVENTION

The term "water soluble" means that the compound has a water to oil partition coefficient of at least 0.90—when added to a water/oil mixture, the compound will partition between the phases with 90% in the aqueous phase and 10% in the oil or organic phase. In certain embodiments, water soluble means the ratio of 0.95. In other embodiments, water soluble means that the ratio is 0.995. In other embodiments, water soluble means that the ratio is 0.999. Of course, in the extreme embodiments, the ratio is 1.0.

The term "oil soluble" means that the compound has a water to oil partition coefficient of at least 0.10—when added to a water/oil mixture, the compound will partition between the phases with 10% in the aqueous phase and 90% in the oil or organic phase. In certain embodiments, oil soluble means the ratio of 0.05. In other embodiments, oil soluble means that the ratio is 0.005. In other embodiments, water soluble means that the ratio is 0.001. Of course, in the extreme embodiments, the ratio is 0.0.

SUMMARY OF THE INVENTION

The present invention provides a dual action composition for reducing noxious sulfur species in pipelines that transmit fluids including an aqueous phase and an organic or oil phase such as pipelines associated with sewage collection system, especially, sewage collection systems that include force mains or in oil collection systems transmitting fluid including an aqueous phase and an oil phase or in any other system transmitting bi-phasic fluids. The composition includes water, a water soluble sulfur scavenger, an oil soluble sulfur scavenger and an emulsifier or surfactant or mixtures thereof present in an amount sufficient to produce a homogeneous composition.

The present invention provides a method for reducing noxious sulfur species in pipelines that transmit fluids including an aqueous phase and an organic or oil phase such as pipelines associated with sewage collection systems, especially, sewage collection systems that include force mains or in oil collection systems transmitting fluid including an aqueous phase and an oil phase or in any other pipeline or pipeline collection system transmitting bi-phasic fluids. The method includes the step of administering an effective amount of a composition of this invention to a pipeline or some or all pipelines of a bi-phasic collection system at one location or a plurality of locations. The effective amount is an amount sufficient to reduce concentrations of noxious species individually and simultaneously in both phases of the bi-phasic fluid, especially in any organic layer that tend to form on pipeline walls in portions of the pipeline where flow rates are laminar and not turbulent. Under laminar fluid flow conditions, organic (slime layers in sewage collection systems) can coat an interior wall of the pipeline. If the organic layer is nutrient rich such as a slime layer in sewage pipelines, sulfur producing bacteria can grow producing noxious sulfur species requiring a dual action sulfur scavenging composition, one that acts to reduce noxious sulfur species both in the aqueous phase and the organic or oil phase.

DETAILED DESCRIPTION OF THE INVENTION

The inventors have found that a composition can be formulated that is capable of reducing noxious sulfur species produced in collection systems that transmit bi-phasic fluids, especially, bi-phasic fluid including one phase that form layer on pipeline walls under slow fluid flow rates. The inventors have found that the composition can be administered to the collection system in such as ways as to separately and simultaneously reduce noxious sulfur species levels, especially, $H_2S$ levels in both phases. In sewage collection system having force mains, the inventors have found that the compositions of this invention can be administered to the system to separately and simultaneously reduce noxious sulfur species produced in slime layers coating the force mains and transferred to the aqueous phase, thereby reducing odor in both phases, reducing pipeline wall corrosion and reducing levels of $H_2S$ in overhead spaces. The composition includes a water soluble sulfur scavenger, an oil soluble sulfur scavenger and an emulsifier or surfactant or mixture thereof present in an amount sufficient to produce a homogeneous composition. The oil soluble components of the composition (oil soluble sulfur scavenger and emulsifier) are adapted to partition into the organic phase and especially into layers such as slime layers (slime layers generally comprise fatty oils and greases), that build up on interior pipeline walls such as the walls of force mains, and to reduce noxious sulfur species in the organic phase and in such layers, especially, layers that support sulfate producing bacterial growth. The water soluble components are adapted to partition into the aqueous phase and reduce noxious sulfur species in the aqueous phase or transferred to the aqueous phase from the organic phase. The inventors have found that this composition affords a more economical treatment solution because noxious sulfur species, especially $H_2S$ are separately and simultaneously reduced in both phases. The inventors have also found that corrosion to the pipeline is reduced because the oil based sulfur scavenger is scavenging noxious sulfur species such as $H_2S$ in layers formed on interior surfaces of the pipeline, even those layers that produced noxious sulfur species due sulfate reducing bacteria (SRBs). The inventors have also found that the emulsifier(s) or surfactant(s) assist in reducing the organic layer formation and build up by increasing the amount of organics emulsified into the aqueous phase as the bi-phase fluid such as sewage travels through the pipelines, especially force mains.

The present invention broadly related to a composition for reducing noxious sulfur species in bi-phasic collection systems or pipelines transmitting bi-phasic fluids. The compositions include water, a water soluble sulfur scavenger component, an oil soluble sulfur scavenger component and an emulsifier or surfactant present in an amount sufficient to produce a homogeneous product. The compositions are adapted to separately and simultaneously reduce noxious sulfur species in both phases and in layers that form and build up on interior surfaces of pipelines or collection systems. In sewage collection systems, the composition is adapted to reduce concentrations of noxious species produced in a slime layer coating pipeline such as force mains, to reduce corrosion of the force mains in contact with the slime layer due to produced noxious sulfur species and to reduce concentrations of noxious species transferred from the slime layer and organic phase into the aqueous phase within the force mains.

The present invention broadly related to a method for reducing noxious sulfur species in bi-phasic collection systems or pipelines transmitting bi-phasic fluids. The method includes the step of administering an effective amount of a composition of this invention to the pipeline or some or all of the pipelines of a collection system. The amount is sufficient to separately and simultaneously reduce noxious sulfur species in both phases and in layers that form and build up on interior surfaces of pipelines or collection systems. The administration can be at a single location or at multiple locations. In sewage collection system, especially those including force mains, the amount is sufficient to reduce concentrations of noxious species produced in a slime layer coating the force mains, to reduce corrosion of the force mains in contact with the slime layer due to produced noxious sulfur species and to reduce concentrations of noxious species transferred from the slime layer to an aqueous phase within the force mains. The administration can be continuous, semi-continuous (continuous with breaks between continuous periods), periodic, or intermittent.

Sewage collection systems often include force mains. These are sewage lines, where the sewage is forced to travel up a grade or hill. In these lines, the sewage flow become laminar. Under laminar flow conditions, water insoluble components in the sewage will migrate to the wall of the pipe producing a so-called slime layer. Such slime layers are a rich biomass and are ideal environments for sulfate reducing bacteria (SRBs). SRBs produce noxious sulfur species including $H_2S$ as they grow. These noxious sulfur species can then transfers to the faster moving aqueous phase within the line. The production of the noxious sulfur species in the slime layer is responsible for a number of vexing problems. The noxious sulfur species produce foul odor in both the aqueous and organic phases and the noxious sulfur species induce corrosion of the pipe walls in contact with the noxious sulfur producing, slime layer coating the pipe.

Oil production pipelines and oil production collection systems like sewage system commonly transmit bi-phasic fluids, fluids including an aqueous phase and an organic or oil phase, and noxious sulfur species are found in both phases. Moreover, in such oil production pipelines and systems, organic or oils layers can form on interior surfaces of the pipelines or systems trapping noxious sulfur species and frustrating attempts to control them with single action scavenger system.

Compositional Ranges

The composition generally includes between 5 wt. % and 75 wt. % of a water soluble sulfur scavenger or a plurality of water soluble sulfur scavengers, between 5 wt. % and 75 wt. % of an oil soluble sulfur scavenger or a plurality of oil soluble sulfur scavengers, between 5 wt. % and 50 wt. % of a surfactant or plurality of surfactants and between about 5 wt. % and 50 wt. % water.

In certain embodiments, the composition includes between 25 wt. % and 75 wt. % of a water soluble sulfur scavenger or a plurality of water soluble sulfur scavengers, between 5 wt. % and 25 wt. % of a water soluble sulfur scavenger or a plurality of oil soluble sulfur scavengers, between 10% and 30% of a surfactant or plurality of surfactants and between about 10 wt. % and 50 wt. % water.

In certain embodiments, the composition includes between 30 wt. % and 70 wt. % of a water soluble sulfur scavenger or a plurality of water soluble sulfur scavengers, between 5 wt. % and 20 wt. % of a water soluble sulfur scavenger or a plurality of oil soluble sulfur scavengers, between 10% and 30% of a surfactant or plurality of surfactants and between about 10 wt. % and 50 wt. % water.

In other embodiments, the composition includes between 40 wt. % and 60 wt. % of a water soluble sulfur scavenger or a plurality of water soluble sulfur scavengers, between 5 wt. % and 15 wt. % of a water soluble sulfur scavenger or a plurality of oil soluble sulfur scavengers, between 15% and 30% of a surfactant or plurality of surfactants and between about 10 wt. % and 50 wt. % water.

In certain embodiments, the composition includes between 45 wt. % and 55 wt. % of a water soluble sulfur scavenger or a plurality of water soluble sulfur scavengers, between 7.5 wt. % and 12.5 wt. % of a water soluble sulfur scavenger or a plurality of oil soluble sulfur scavengers, between 10% and 20% of a surfactant or plurality of surfactants and between about 10 wt. % and 50 wt. % water.

Treatment Amounts

The composition is generally administered at a rate between 10 and 1 gallons per day. Of course, the exact amount of composition administered will depend on the application and the nature of the bi-phasic fluid; however, these general administration amounts are set forth as that amounts used in most application. Thus, some applications may need more than 10 gallons per day and other may require less then 1 gallon per day. In certain embodiments, the composition is administered at a rate between 8 and 1 gallons per day. In other embodiments, the composition is administered at a rate between 5 and 1 gallons per day. In other embodiments, the composition is administered at a rate between 4 and 1 gallons per day. In other embodiments, the composition is administered at a rate between 4 and 2 gallons per day. In other embodiments, the composition is administered at a rate between 3 and 2 gallons per day. While in most application, the administration is performed on a continuous basis, the exact administration may be continuous, semi-continuous, periodic, intermittent, a combination of segments of continuous, semi-continuous, periodic, intermittent intervals, operated adjusted, or adjusted by a monitoring system so that a constant acceptable low level of noxious sulfur species is maintained in a monitoring location or in the two phases. Of course, the low level may different in the two phases.

Suitable Reagents

Suitable water soluble sulfur scavengers for use in the present invention include, without limitation, any sulfur scavenger, where at least (greater than or equal to) 90% of sulfur scavenger partitions into the aqueous phase of a bi-phasic fluid. In certain embodiments, the water soluble sulfur scavenger will partition at least 95% into the aqueous phase. In other embodiments, the water soluble sulfur scavenger will partition at least 99% into the aqueous phase. In other embodiments, the water soluble sulfur scavenger will partition at least 99.5% into the aqueous phase. In other embodiments, the water soluble sulfur scavenger will partition at least 99.95% into the aqueous phase. In other embodiments, the water soluble sulfur scavenger will partition 100% into the aqueous phase or substantially 100% (trace amounts will still be detectable in the organic phase). Exemplary examples of water soluble sulfur scavengers include triazine type, water soluble sulfur scavengers, non-triazine type, water soluble sulfur scavengers, water soluble amine-aldehyde reaction products, any other water soluble compound capable of reacting with noxious sulfur species rendering them non-noxious, or mixtures or combinations thereof. A non-limiting list of commercial water soluble sulfur scavenger include Alpha One, Sulfa-Clear® 8001FD, Sulfa-Clear® 8211, Sulfa-Clear® 8250, Sulfa-Clear® 8256, Sulfa-Clear® 8311, Sulfa-Clear® 8411C, Sulfa-Clear® 8411, Sulfa-Clear® 8419, Sulfa-Clear® 8640, Sulfa-Clear® 8649, available from Clearwater International, LLC, 4420 S. Flores Road, Elmendorf, Tex. 78112, any other water soluble sulfur scavenger now available or that will become commercially available in the future, or mixtures or combinations thereof, where Sulfa-Clear® is a registered trademark of Weatherford/Lamb Inc.

Suitable oil soluble sulfur scavengers for use in the present invention include, without limitation, any sulfur scavenger, where at least (greater than or equal to) 90% of the sulfur scavenger partitions to the oil or organic phase of a bi-phasic fluid. In certain embodiments, the oil soluble sulfur scavenger will partition at least 95% into the oil or organic phase. In other embodiments, the oil soluble sulfur scavenger will partition at least 99% into the oil or organic phase. In other embodiments, the oil soluble sulfur scavenger will partition at least 99.5% into the oil or organic phase. In other embodiments, the oil soluble sulfur scavenger will partition at least 99.95% into the oil or organic phase. In other embodiments, the oil soluble sulfur scavenger will partition 100% into the oil or organic phase or substantially 100% (trace amounts will still be detectable in the aqueous phase). Exemplary examples of oil soluble sulfur scavengers include triazine type, oil soluble sulfur scavengers, non-triazine type, oil soluble sulfur scavengers, oil soluble amine-aldehyde reaction products, any other oil soluble compound capable of reacting with noxious sulfur species rendering them non-noxious, or mixtures or combinations thereof. A non-limiting list of commercial oil soluble sulfur scavenger include Sulfa-Clear® 8849, Sulfa-Clear® 8199, Sulfa-Clear® 8050 available from Clearwater International, LLC, 4420 S. Flores Road, Elmendorf, Tex. 78112, any other oil soluble sulfur scavenger now available or that will become commercially available in the future, or mixtures or combinations thereof.

Suitable surfactants, emulsifiers or emulsifying agents include, without limitation, anionic surfactants, cationic surfactants, non-ionic surfactants, zwitterionic surfactants, those disclosed in U.S. patent application Ser. No. 10/745,290, filed Dec. 23, 2003 and 10/839,734, filed May 5, 2004, incorporated herein by reference, or mixtures or combinations thereof. A non-limiting list of exemplary examples include IGEPAL® CO-210, IGEPAL® CO-610, IGEPAL® CO-730, IGEPAL® CO-660, IGEPAL® CO-720, IGEPAL® CO-850, IGEPAL® CO-987 or mixtures or combinations thereof, where IGEPAL® is a registered trademark of SigmaAldrich Corporation.

EXPERIMENTS OF THE INVENTION

Example 1

This example illustrates the preparation of a composition of this invention including the water soluble sulfur scavenger Sulfa-Clear® 8411C, the oil soluble sulfur scavenger Sulfa-Clear® 8849 and the surfactant IGEPAL® CO-630 surfactant, nonyl phenol 9 mole ethoxylate surfactant.

Preparation 50 wt. % of Sulfa-Clear® 8411C was added to a vessel with mixing. 20 wt % of IGEPAL® CO-630 was added followed by 10 wt. % Sulfa-Clear® 8849. The resulting composition was mixed for 15 minutes. To this composition was added sufficient water to result in a composition containing 36.92 wt. % water. The resulting composition was mixed for an additional 30 minutes. In this formulation, the amount of Sulfa-Clear® 8849 should not exceed 10 wt. % or the solution becomes cloudy and may separate over time. The water amount should not include an additional 8-10 wt. % of water, because the Sulfa-Clear® 8849 starts to separate out. Of course, these problems can be easily remedied by adding more or different surfactants.

Physical Properties

The resulting composition had the following properties:

| Property | Actual Values | Acceptable Values |
|---|---|---|
| Specific Gravity | 1.03 | 1.02-1.04 |
| Density (lb/gal) | 8.58 | 8.50-8.66 |

| Property | Actual Values | Acceptable Values |
|---|---|---|
| pH | 9.53 | 8.5-10.5 |
| Water wt. % | 36.92 | 30-40% |
| Appearance | Clear yellow/orange liquid | |

Comparative Examples

This example illustrates the treatment of a municipal sewage collection system using hydrogen peroxide, magnesium hydroxide, and Sulfa-Clear® 8640, a sulfur scavenger available from Clearwater International, LLC, 4420 S. Flores Road, Elmendorf, Tex. 78112.

The municipal sewage collection system has had a chronic $H_2S$ odor and corrosion issue within a 3 mile long force main line. The $H_2S$ odor and corrosion issues associated with this force main are a result of low flow rate (approximately 65,000 gpd—gallon per day) resulting in retention times that exceed 24 hours. The flow rate in the line is below 0.2 ft/s. As a result, very little if any mixing occurs in the force main due to the flow dynamics in the system. Low flow rate and low flow velocity creates challenges for most chemical odor control products. Untreated this force main has dissolved sulfide levels of 60 ppm and vapor phase $H_2S$ in the manhole at the end of the force main that have been as high as 200 ppm.

Hydrogen peroxide was administered to the system with negligible results prior to the application of Sulfa-Clear® 8640. In addition, Thioguard (magnesium hydroxide) was tried after Sulfa-Clear® 8640 and odor issues still persisted as the magnesium hydroxide was not able to solubilize in the water and elevate the pH. The hydraulics of this force main create difficult problems for effective application of any odor control chemical.

Next, Sulfa-Clear® 8640, a sulfur scavenger containing dibromo-nitrilipropionamide (DBNPA) was administered to the system. The Sulfa-Clear® 8640 had to be fed at a prohibitively high addition rate to have any effect on reducing dissolved sulfide levels. The first time Sulfa-Clear® containing DBNPA was used, the results achieved were very good. After the initial two days of treatment, dosage levels were cut in half twice and this system was maintaining dissolved sulfide levels of several ppm at an addition rate of 2 gpd The sulfide scavenging the DBNPA product produced represented a 96% reduction rate. This contrasted with the previous Sulfa-Clear® 8640 addition rates of 10-12 gpd that only reduced dissolved sulfide levels by 50%

The Sulfa-Clear® product containing DBNPA was then administered to the system for a retrial with disappointing results in the spring and summer. It was theorized that the SRB replication rate greatly increased in the warmer months resulting reducing the effect of the DBNPA.

The inventors believed that the problem may result from insufficient contact between the Sulfa-Clear® and material moving slow through the force main.

Example 2

This example illustrates the treatment of the same municipal sewage collection system using the composition of Example 1.

Four 55 gallon drums of the composition of Example 1 were delivered to permit continuous treatment over a 3 week period. The composition of Example 1 was metered into the force main on a continuous basis. Dissolved sulfide levels in the force main were measured at 60 ppm prior to the addition.

On the first day, 12 gallons of the composition of Example 1 was added. Sulfide levels were reduced to 30 ppm, when measured the next day. On the second day, 8 gallons of the composition of Example 1 was added and dissolved sulfide levels were reduced to 14 ppm. On the third day, the addition rate of the composition of Example 1 was reduced to 4 gallons a day and dissolved sulfide levels were recorded at approximately 5 ppm.

On subsequent days, the addition rate of the composition of Example 1 was reduced to 3 gallons per day; then to 2 gallons per day. The addition rate of the composition of Example 1 was held at a 2 gallon per day addition rate for the balance of the trial and resulted in a maintained dissolved sulfide concentration between 2-3 ppm.

The municipality wanted to achieve the lowest addition level of the composition of Example 1, while maintaining a 2-3 ppm dissolved sulfide level. The municipality did not need to reduce dissolved sulfides to 0 ppm, but only sufficient to reduce vapor phase $H_2S$ levels in the manhole at the end of the main to below 10 ppm.

The composition of Example 1 achieved the objective of delivering excellent sulfide scavenging results at a desired efficient level of consumption in a force main system where other products have failed. The combination of a water soluble sulfur scavenger and an emulsified oil based sulfur scavenger permitted the emulsified oil based sulfur scavenger to be solubilized in the slime layer greatly reduces the need for turbulent flow in the force main or gravity line collection system to achieve excellent sulfide scavenging performance at a desirable utilization rate. The emulsified oil based sulfur scavenger is also thought to reduce the slime layer by assisting in the solubilization of organic components in the aqueous phase.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for reducing noxious sulfur species in a pipeline transmitting a bi-phasic fluid comprising the step of:
administering, to a liquid-liquid bi-phasic fluid being transmitted through a pipeline, an effective amount of a composition comprising:
water,
a water soluble sulfur scavenger component,
an oil soluble sulfur scavenger component and
an emulsifier or surfactant, where the emulsifier or surfactant is present in an amount sufficient to produce a stable, homogeneous composition including an emulsified oil soluble sulfur scavenger,
where the bi-phasic fluid includes an aqueous phase, an organic or oil phase and noxious sulfur species are found in both phases, where the water soluble sulfur scavenger component is adapted to partition into the aqueous phase, where the oil soluble sulfur scavenger component is adapted to partition into the organic or oil phase and into organic layers that form and build up on interior surfaces of the pipeline and where the effective amount is sufficient to separately and simultaneously reduce concentrations of noxious species in both phases and in the layers that form and build up on interior surfaces of the pipeline and where the emulsified oil soluble sulfur scavenger reduces formation of the layers and build up on interior surfaces of the pipeline.

2. The method of claim 1, wherein the administration is at a single location.

3. The method of claim 1, wherein the administration is at a plurality of locations.

4. The method of claim 1, wherein the pipeline is a sewage pipeline, an oil production pipeline or a pipeline transmitting other bi-phasic fluids.

5. The method of claim 1, wherein the pipeline is sewage pipeline.

6. The method of claim 5, wherein the sewage pipeline is a force main and the oil soluble sulfur scavenger component is adapted to partition into a slime layer formed on interior surfaces of the pipeline reducing noxious sulfur species produced via bacterial activity in the layer and to reduce the formation and build up of the slime layer by increasing organic solubility in the aqueous phase.

7. The method of claim 1, wherein the water soluble sulfur scavenger includes any sulfur scavenger, where at least (greater than or equal to) 90% of water soluble sulfur scavenger partitions into the aqueous phase of a bi-phasic fluid.

8. The method of claim 1, wherein the water soluble sulfur scavenger includes any sulfur scavenger, where at least (greater than or equal to) 95% of water soluble sulfur scavenger partitions into the aqueous phase of a bi-phasic fluid.

9. The method of claim 1, wherein the water soluble sulfur scavenger includes any sulfur scavenger, where at least (greater than or equal to) 99% of water soluble sulfur scavenger partitions into the aqueous phase of a bi-phasic fluid.

10. The method of claim 1, wherein the water soluble sulfur scavenger includes any sulfur scavenger, where at least (greater than or equal to) 99.5% of water soluble sulfur scavenger partitions into the aqueous phase of a bi-phasic fluid.

11. The method of claim 1, wherein the water soluble sulfur scavenger includes any sulfur scavenger, where at least (greater than or equal to) 99.95% of water soluble sulfur scavenger partitions into the aqueous phase of a bi-phasic fluid.

12. The method of claim 1, wherein the water soluble sulfur scavenger includes any sulfur scavenger, where 100% or substantially 100% of water soluble sulfur scavenger partitions into the aqueous phase of a bi-phasic fluid.

13. The method of claim 1, wherein the water soluble sulfur scavenger is selected from the group consisting of water soluble, triazine type sulfur scavengers, water soluble, non-triazine type, sulfur scavengers, water soluble amine-aldehyde reaction product type sulfur scavenger, any other water soluble compound capable of reacting with noxious sulfur species rendering them non-noxious, and mixtures or combinations thereof.

14. The method of claim 1, wherein the oil soluble sulfur scavenger includes any sulfur scavenger, where at least (greater than or equal to) 90% of the sulfur scavenger partitions into the oil or organic phase of a bi-phasic fluid.

15. The method of claim 1, wherein the oil soluble sulfur scavenger includes any sulfur scavenger, where at least (greater than or equal to) 95% of the sulfur scavenger partitions into the oil or organic phase of a bi-phasic fluid.

16. The method of claim 1, wherein the oil soluble sulfur scavenger includes any sulfur scavenger, where at least (greater than or equal to) 99% of the sulfur scavenger partitions into the oil or organic phase of a bi-phasic fluid.

17. The method of claim 1, wherein the oil soluble sulfur scavenger includes any sulfur scavenger, where at least (greater than or equal to) 99.5% of the sulfur scavenger partitions into the oil or organic phase of a bi-phasic fluid.

18. The method of claim 1, wherein the oil soluble sulfur scavenger includes any sulfur scavenger, where at least (greater than or equal to) 99.95% of the sulfur scavenger partitions into the oil or organic phase of a bi-phasic fluid.

19. The method of claim 1, wherein the oil soluble sulfur scavenger includes any sulfur scavenger, where at least (greater than or equal to) 100% of the sulfur scavenger partitions into the oil or organic phase of a bi-phasic fluid.

20. The method of claim 1, wherein the oil soluble sulfur scavenger is selected from the group consisting of triazine type, oil soluble sulfur scavengers, non-triazine type, oil soluble sulfur scavengers, oil soluble amine-aldehyde reaction products, any other oil soluble compound capable of reacting with noxious sulfur species rendering them non-noxious, and mixtures or combinations thereof.

21. The method of claim 1, wherein the surfactant or emulsifier includes anionic surfactants, cationic surfactants, non-ionic surfactants, zwitterionic surfactants, and mixtures or combinations thereof.

22. The method of claim 1, wherein the surfactant or emulsifier is a non-ionic surfactant or a mixture of non-ionic surfactants.

23. The method of claim 1, wherein the composition comprises:
between 5 wt. % and 75 wt. % of a water soluble sulfur scavenger or a plurality of water soluble sulfur scavengers,
between 5 wt. % and 75 wt. % of an oil soluble sulfur scavenger or a plurality of oil soluble sulfur scavengers,
between 5 wt. % and 50 wt. % of a surfactant or plurality of surfactants and
between 5 wt. % and 50 wt. % water.

24. The method of claim 1, wherein the composition comprises:
between 25 wt. % and 75 wt. % of a water soluble sulfur scavenger or a plurality of water soluble sulfur scavengers,
between 5 wt. % and 25 wt. % of an oil soluble sulfur scavenger or a plurality of oil soluble sulfur scavengers,
between 10 wt. % and 30 wt. % of a surfactant or plurality of surfactants and
between 10 wt. % and 50 wt. % water.

25. The method of claim 1, wherein the composition comprises:
between 30 wt. % and 70 wt. % of a water soluble sulfur scavenger or a plurality of water soluble sulfur scavengers,
between 5 wt. % and 20 wt. % of an oil soluble sulfur scavenger or a plurality of oil soluble sulfur scavengers,
between 10 wt. % and 30 wt. % of a surfactant or plurality of surfactants and
between 10 wt. % and 50 wt. % water.

26. The method of claim 1, wherein the composition comprises:
between 40 wt. % and 60 wt. % of a water soluble sulfur scavenger or a plurality of water soluble sulfur scavengers,
between 5 wt. % and 15 wt. % of an oil soluble sulfur scavenger or a plurality of oil soluble sulfur scavengers,
between 15 wt. % and 30 wt. % of a surfactant or plurality of surfactants and
between 10 wt. % and 50 wt. % water.

27. The method of claim 1, wherein the composition comprises:
between 45 wt. % and 55 wt. % of a water soluble sulfur scavenger or a plurality of water soluble sulfur scavengers, between 7.5 wt. % and 12.5 wt. % of an oil soluble sulfur scavenger or a plurality of oil soluble sulfur scavengers,
between 10 wt. % and 20 wt. % of a surfactant or plurality of surfactants and
between 10 wt. % and 50 wt. % water.

28. The method of claim 1, wherein administration is continuous, semi-continuous, periodic, intermittent, a combination of segments of continuous, semi-continuous, periodic, intermittent intervals, operated adjusted, or adjusted by a monitoring system so that a constant acceptable low level of noxious sulfur species is maintained in a monitoring location or in the two phases.

29. The method of claim 1, wherein the effective amount is between 10 and 1 gallons per day.

30. The method of claim 1, wherein the effective amount is between 8 and 1 gallons per day.

31. The method of claim 1, wherein the effective amount is between 5 and 1 gallons per day.

32. The method of claim 1, wherein the effective amount is between 4 and 1 gallons per day.

33. The method of claim 1, wherein the effective amount is between 4 and 2 gallons per day.

34. The method of claim 1, wherein the effective amount is between 3 and 2 gallons per day.

35. The method of claim 1, wherein the pipeline is associated with a collection system.

36. The method of claim 35, wherein the collection system is selected from the group consisting of a sewage collection system, an oil collection system and any other collection system transmitting a bi-phasic fluid.

* * * * *